United States Patent [19]
Cohen

[11] 3,712,742
[45] Jan. 23, 1973

[54] ANALYTICAL CENTRIFUGES HAVING A PHOTOELECTRIC DETECTION

[75] Inventor: René A. Cohen, Paris, France

[73] Assignee: Anvar - Agence Nationale De Valorisation De La Recherche, Paris, France

[22] Filed: Aug. 3, 1970

[21] Appl. No.: 60,599

[30] Foreign Application Priority Data

Aug. 5, 1969 France..................................6926819

[52] U.S. Cl.....................................356/197, 356/186
[51] Int. Cl..............................................G01n 21/24
[58] Field of Search.........356/36, 186, 188, 196, 197

[56] References Cited

UNITED STATES PATENTS

| | | | |
|---|---|---|---|
| 2,113,175 | 4/1938 | Elrod | 356/36 UX |
| 3,089,382 | 5/1963 | Hecht et al. | 356/188 X |
| 3,363,505 | 1/1968 | Stone | 356/186 X |
| 3,411,012 | 11/1968 | Bayly | 356/36 X |
| 3,471,242 | 10/1969 | Nichols | 356/189 X |
| 3,518,012 | 6/1970 | Franklin et al. | 356/197 |
| 3,555,284 | 1/1971 | Anderson | 356/36 UX |
| 3,572,930 | 3/1971 | James et al. | 356/36 |

FOREIGN PATENTS OR APPLICATIONS 1,188,472   4/1970   Great Britain..........................356/36

Primary Examiner—Ronald L. Wibert
Assistant Examiner—V. P. McGraw
Attorney—William Anthony Drucker

[57] ABSTRACT

An analytical centrifuge comprising logical circuits for separating signals from various centrifuging cells and, for each cell, from the two compartments of the cell.

These logical circuits are brought into action by synchronization pulses produced by an auxiliary photomultiplier for one or several predetermined angular positions of the rotor. The signals corresponding to the respective cell compartments are integrated separately each signal corresponding to the totality of the light passing through each compartment. This centrifuge is of utility in particular for examining the movements of a macromolecule in a solution subjected to a field of forces.

7 Claims, 6 Drawing Figures

ANALYTICAL CENTRIFUGES HAVING A PHOTOELECTRIC DETECTION

The present invention relates to analytical centrifuges.

These apparatuses, employed in the optical observation of the movement of macromolecules in solution, comprise one or more centrifuging cells disposed in a rotor which may reach angular velocities of up to 68,000 rpm, a fixed source of light, an optical system which forms an image of the contents of the cell at the instant when the latter intercepts the light beam from the light source, and means for measuring during a given time the optical density at different points of this image. The variation in this optical density from the part of the image which corresponds to the meniscus of the solution contained in the cell to the part of the image corresponding to the bottom of the solution in fact directly expresses the variation in the concentration of the macromolecule in the cell. As the measurement is carried out during a given period of time, knowledge is obtained of the movement of the macromolecules in a known field of centrifugal forces whence it is possible to deduce the properties of the macromolecule examined.

In addition to the aforementioned light beam and optical measuring system, the apparatus comprises an auxiliary optical system and light beam. The optical system is a Schlieren optical system which serves to analyze gradients in the refraction index in the cell.

Each cell usually comprises two compartments, one containing in solution the product to be examined and the other containing the solvent alone and serving as a reference for the light intensity.

It should also be mentioned that the rotor of the apparatus has a small orifice termed a "geometric reference" orifice and that a counterweight provided with orifices is sometimes placed in one of the cavities for the cells in the rotor.

These various orifices are traversed by the measuring beam of light and, in the conventional version of the apparatus in which the image is recorded photographically, they serve to effect certain markings on the photograph.

This conventional version of the apparatus has the drawback of requiring a very long analyzing time, for example between 3 and 20 hours depending on the required fineness of the analysis. Consequently, a photoelectric detection is increasingly used in which a photomultiplier, associated with a slit, explores the image of the cell with a uniform movement. For each revolution or the rotor this photomultiplier delivers an elementary signal corresponding to a given point of the image and comprising two pulses. The first pulse corresponds to the solution examined and its amplitude depends on the concentration of the macromolecules at the considered point of the image. The amplitude of the second pulse furnishes the light intensity reference.

Known apparatuses of the photomultiplier type usually comprise, for treating the elementary signals, peak detecting circuits which give the amplitude of each pulse, differential amplifiers which give the relative amplitude of the first and second pulse of each signal, logarithmic amplifiers which give analog signals proportional to the optical densities (logarithms of the light intensities) and a recorder which traces the distribution of the concentration along the cell. Several distribution curves are traced in the course of a given number of periodically effected explorations.

The apparatus becomes very complex when it is capable of operating in a multiplex manner, that is, when it is capable of simultaneously centrifuging a plurality of cells, for example four cells. Indeed, in this case, it must comprise means for sorting the interposed elementary signals from the different cells.

However, the major drawback of this type of apparatus resides in the fact that it affords neither the exact value of the optical density at a given point of the cell, in contrast with the photographic version, nor the correct mean distribution of this optical density with respect to time for the whole of the cell.

To understand the origin of this source of errors, it should be realized that, having regard to the insufficiency of the available sources of light, the photomultiplier must effect a necessary relatively slow exploration from the meniscus to the bottom, lasting for example from 20 to 30 seconds.

Now, the peak of each pulse undergoes considerable fluctuations inherent in a low-intensity photoelelectronic emission. The peak detection therefore results in widely fluctuating results from one pulse to the next, the relative fluctuation being the greater as the product examined is more absorbent.

There results a systematic error by excess which is in no way reduced by taking the mean of a large number of pulses. The differential analysis of the amplitudes of the two pulses of the signal increases still more this error.

Further, if there is considered a point of the image corresponding to the neighborhood of the bottom of the cell and another point corresponding to the neighborhood of the meniscus, the value of the optical density is recorded for the second point several tens of seconds after the recording of the value of the optical density at the first point. Consequently, the distribution curve obtained corresponds neither to a well-determined instant nor to a mean. It can be shown that with certain types of experiments this introduces in the required parameter an error of several units per cent, whereas a precision of the order of 0.5 percent is required.

The object of the present invention is to eliminate these causes of errors and to provide an analytic centrifuge of the type having a photomultiplier capable of affording the exact optical density at each point of the cell and the mean distribution, with respect to time, of this density throughout the length of the cell.

According to a fundamental feature of the invention, the recurrent pulses constituted by the aforementioned elementary signals are separated from each other and integrated individually, this separation being achieved by means of logical circuits controlled by synchronization pulses generated by an auxiliary photomultiplier for one or several predetermined angular positions of the rotor, an analog-digital conversion being thereafter effected on the information elementary units thus obtained before they are treated for obtaining the optical densities therefrom.

It should be stressed that in this method, the integration of each pulse, such as it issues from the photomultiplier, enables the whole of the information contained in this pulse to be obtained. The error in the measurement will no longer have any systematic character and may be theoretically reduced to a value as low as it is desired by taking a mean value over a sufficient number of cycles.

Further, the same separation logical circuits are capable of both sorting the two pulses produced by each cell and sorting the pulses coming from several different cells. This separation is carried out without employing the leading edges of the measurement signal itself for triggering the logical circuits and therefore has a much higher precision.

No treatment of the information in its analog form is contemplated in this method; a computer will receive the digital information elementary units and will calculate the optical densities. In this way certain drawbacks of the apparatuses of the prior art are avoided, such as : lack of linearity and large amplitude drifts coming for a large part from the logarithmic and differential amplifiers; treatment in accordance with a non-modifiable programme which is determined once and for all by the analog circuits of the apparatus.

It is obvious that the idea of treating the information contained in the measuring signals of an analytical centrifuge by means of a computer is not new per se.

Figure 1:
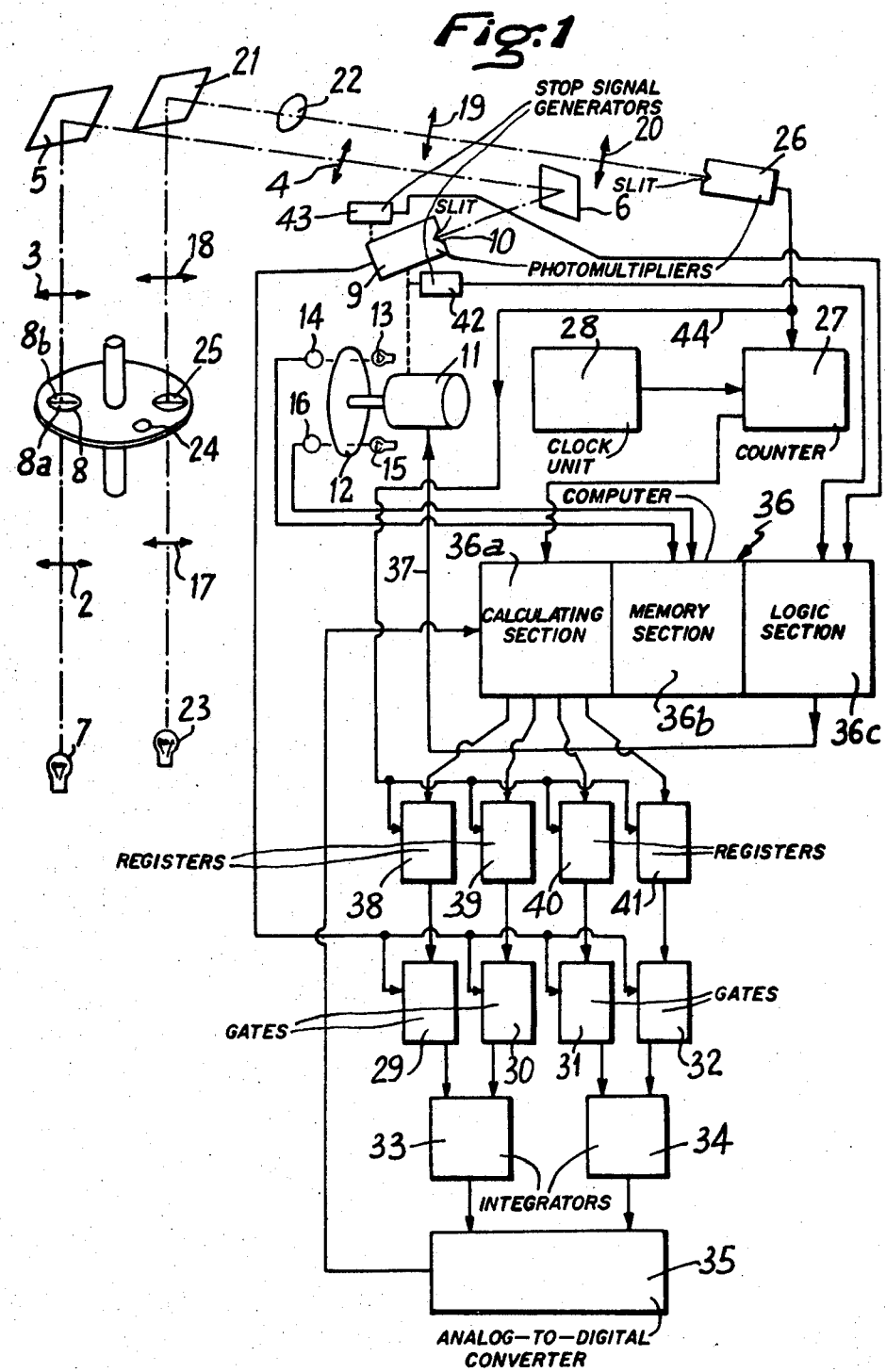
FIG. 1 is a block diagram of an analytical centrifuge according to a preferred embodiment of the invention.

The optical measuring system has been shown merely in the form of lenses 2, 3 and 4 and two mirrors 5 and 6 disposed in the path of a fixed beam of light coming from a source 7. This path is normally intercepted by the opaque rotor except when, once per revolution of the rotor, it passes through one of two transparent sectors 8a and 8b of a cell 8. A photomultiplier 9, associated with a slit 10, then generates an electric pulse. To effect the exploration of the image of the cell, the photomultiplier effects a movement controlled by a motor 11. The different successive positions of the slit in the course of this movement are coated by a disk 12 which is associated with a unit consisting of a light source 13 and a photodetector 14.

Another unit consisting of a light source 15 and a photodetector 16, or any other suitable means, furnishes the indication of the number of movements undergone by the slit in the course of an analysis (revolution counter pulses).

Such coding means already exist in certain known apparatuses and serve to effect a marking of the recording.

The auxiliary optical system, also of known type, comprises for example lenses 17 to 20, a mirror 21, and a diaphragm 22. It is associated with a light source 23 whose beam passes, once per revolution of the rotor, through a small orifice 24 placed in a well-determined angular position with respect to the cells (by way of example, to which it is not intended to limit the invention, two cells 8 and 25 are shown, the cavities for these cells being diametrically opposed on the rotor).

The means utilizing the auxiliary light beam (Schlieren optical system) are well known and have not been illustrated. On the other hand, there is shown in the path of this beam an auxiliary photomultiplier 26 which, in the presently-described apparatus, furnishes the synchronization pulses. These pulses control the interval of time during which the counter 27 counts pulses furnished by a clock 28.

The measurement pulses produced by the photomultiplier are transmitted through gates 29 to 32 to two integrators 33 and 34 whose output signals are put in digital form by an analog-digital convertor 35 before being sent to the calculation section 36a of a computer 36. The values of the optical densities calculated by the computer are memorized in the memory section 36b. The computer also has a logic section 36c which will be employed in the manner explained hereinafter and will control the reversing of the motor 11 (this has been symbolically represented by a lead 37).

The gages 29 to 32 are controlled by signals from four counting registers 38 to 41, which are themselves actuated by the computer.

The means producing the left and right stop signals mentioned hereinbefore have been symbolically represented by small rectangles 42 and 43 respectively.

The operation of the apparatus just described briefly (its description will be completed hereinafter with reference to the detail diagrams) will be better understood with reference to the waveforms shown, with different time scales, in FIGS. 2 to 4.

Figure 2:
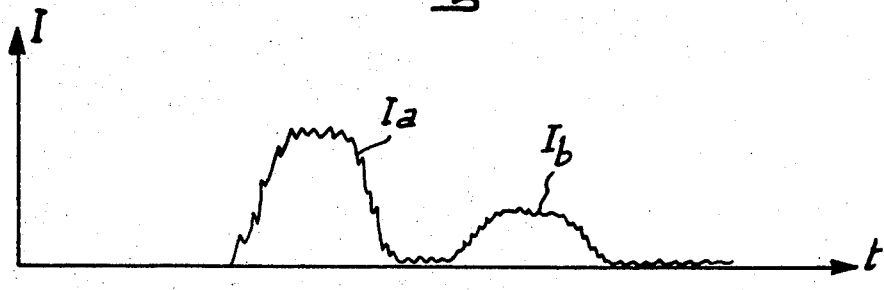
FIG. 2 shows the shape of the pulses constituting each elementary signal.

FIG. 2 shows the two successive pulses $Ia$ and $Ib$ corresponding respectively to the passage of the measurement beam through the reference sector of a cell and to its passage through a sector which contains the solution being examined.

Depending on the speed of the rotor, the duration of each pulse is between 5 microseconds and 1 millisecond, which explains the very considerable difficulty experienced in separating these two pulses from each other by triggering sorting logical circuits by the leading edges of the waves of the pulses themselves. Moreover, and in particular if the product is very absorbent, the photomultiplier transmits only one or a few tens of photoelectrons per pulse and, in the neighborhood of their peak value, the amplitude fluctuation may be considerable. This is why the intention of the invention is to integrate each pulse separately. This gives a value proportional to its area and therefore containing all of the useful information.

Figure 4:
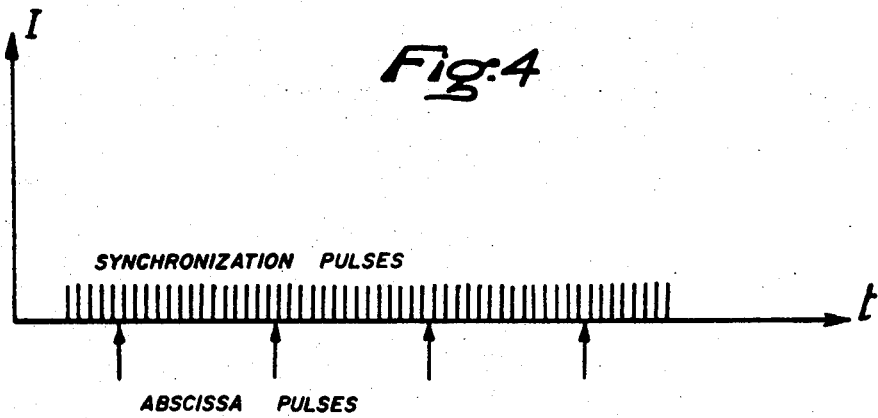
FIG. 4 shows, on a still smaller scale, the abscissae pulses and the synchronization pulses.

In FIG. 4, the synchronization pulses $T_s$ coming from the auxiliary photomultiplier 26 are shown above the time axis whereas the abscissae pulses from the unit 13–14 are shown below the time axis. For reasons of clarity of the drawing, there has not been shown between each pair of abscissae pulses as large a number of synchronization pulses as that which is in fact employed when it is desired to obtain a mean value.

The time which elapses between two successive abscissae pulses is for example between 3 milliseconds and 10 seconds, depending on the desired speed of exploration, whereas the time which elapses between two synchronization pulses is for example between 880 microseconds and 60 milliseconds, depending on the speed of rotation of the rotor. There is no phase relation between the abscissae pulses and the synchronization pulses. There are for example 300 abscissae pulses during one movement of the photomultiplier.

There are of course between two synchronization pulses, $p$ pairs of measurement pulses, if $p$ is the number of cells.

Figure 3:
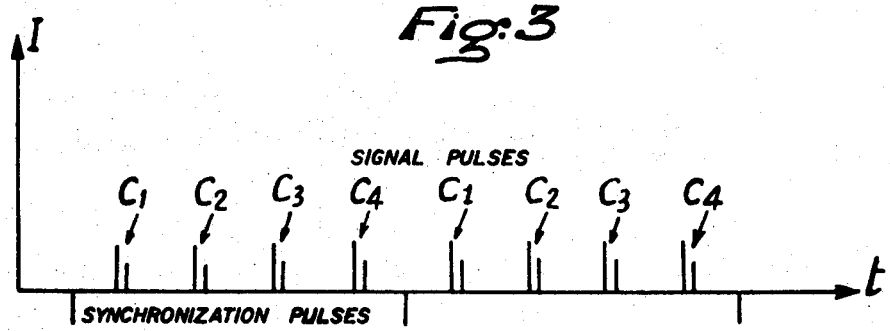
FIG. 3 shows, on a reduced scale, the synchronization pulses and the pairs of pulses corresponding to four cells.

FIG. 3 shows the case of four cells $C_1$ to $C_4$.

The synchronization pulses are shown below the time axis and the measurement pulses above the latter.

For example, between 110 microseconds and 4.5 milliseconds elapse between one synchronization pulse and the pulses corresponding to the cell $C_1$, and between 220 microseconds and 15 milliseconds between the pulses corresponding to two successive cells. These numerical values, to which it is not intended to limit the invention, give some idea of the difficulty in the sorting of these pulses.

With reference again to FIG. 1, the clock 28 furnishes recurrent pulses, for example at the frequency of 5 MHz. During every other revolution of the rotor, the counter counts the clock pulses and thus applies to the computer a number N which is proportional to the duration of 1 revolution and from which the computer, which has been suitably programmed for this purpose, calculates numbers which define predetermined fractions of the duration of 1 revolution. These fractions of the cycles of the measurement signal are such that they frame the various pulses in said cycle, for the purpose of separating them.

The numbers thus calculated by the computer are applied to the registers 38 to 41 which store them in the course of each cycle. At the following synchronization pulse these registers, which receive said pulse through the lead 44, start to decrease their count under the action of the pulses of the clock at 5MHz. Each time that one of them returns to the zero state, the gate associated therewith changes its state.

The logic device thus established has only been given by way of example. Two gates per integrator have been provided, namely one for putting the integrator in operation and the other for connecting it to ground following its period of operation. The different pulses of each cycle are thus integrated separately and, after an analog-digital conversion, the corresponding untreated digital informations are sent to the calculation section 36a which has been programmed, for example, for deducing the mean optical density between two successive abscissae pulses.

The optical densities are memorized first during the "forward" movement of the photomultiplier (for example from the left to the right), the values of the optical densities corresponding to a certain number of abscissae being stored at a corresponding number of addresses of the memory.

During the forward exploration, the computer assigns an order number to each of the abscissae pulses and also to each of the revolution counter pulses (it has suitable counters for this purpose). Each position is thus exactly marked, so that, in the course of the following return exploration, the computer can store the return information corresponding to a given position at the same address as the forward information corresponding to the same position. It is therefore able to take the mean value of a forward information and a return information which were obtained at instants separated by an interval of several tens of seconds.

More precisely, the useful zone of the image is defined by the two stop signals mentioned hereinbefore. To the left of the left stop, the left stop signal is equal to 1 whereas it is equal to 0 to the right of the left stop. The right stop signal is equal to 1 to the righ of the right stop and to 0 to the left of the right stop. This exploration path located to the left of the left stop is therefore defined by the state 10, the path located between the two stops (useful zone) by the state 00 and the path located to the right of the right stop by the state 01.

The logic section of the computer, upon the passage of a stop, can consequently reverse the direction of operation of motor 11 and start or stop the measurement and countings.

In the forward direction, upon the passage of the left stop, the computer starts, the counting of the abscissae pulses and revolution counter pulses and the measurement.

Upon the passage of the right stop, the motor reversing command is given and at the same time the counting and the measuring stop.

However, the motor continues to rotate for a few milliseconds and then moves in the opposite direction. It is only when the following revolution counter pulse is produced that the measurement is resumed. At this moment, the two abscissae and revolution counter counters again start to count until the left stop is reached, whereupon the operation ceases if there is a single forward and return movement.

It will be understood that in this way there is a loss of the information contained in the very small portion of the image which is explored between the passage of the righ stops and the nearest revolution counter pulse.

However this is of no inconvenience in practice.

Figure 5:
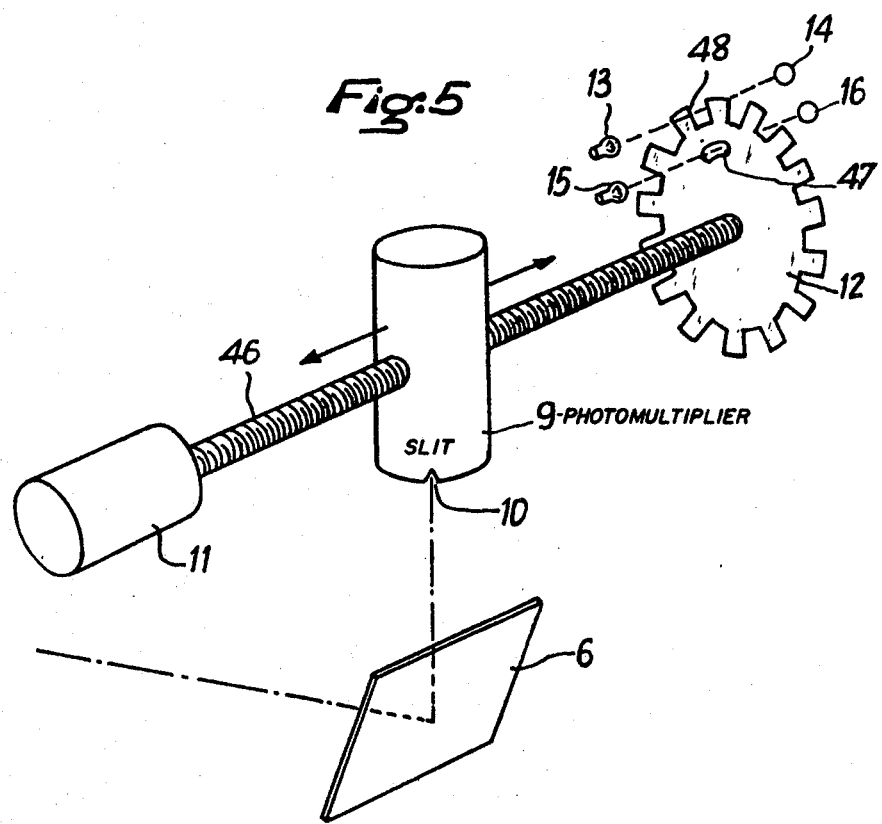
FIG. 5 is a diagrammatic perspective view of the measuring photomultiplier and its control system and movement detecting system.

FIG. 5 shows diagrammatically the measurement photomultiplier 9, the slit 10, the drive motor 11, the coding disk 12, and the light source-photodetector units 13–14 and 15–16 mentioned hereinbefore with reference to FIG. 1.

The measurement light beam, represented symbolically by a dot-dish line, impinges on a mirror 6 and enters the slit 10.

The movement of the photomultiplier in a direction perpendicular to the light beam incident to the mirror 45 is produced by a leadscrew 46 which is rotated by the motor 11 at the same time as the disk 12.

The disk 12 has a single aperture 47 which is so disposed as to intercept, once per revolution, the light beam travelling from the source 15 to the photodetector 16 so as to produce the revolution counter pulses.

Disk 12 also has on its periphery a plurality of tabs or projections, such as 48, which intercept in succession the light beam travelling from the source 13 to the photodetector 14 so as to produce the abscissae pulses.

This manner of marking the positions of the photomultiplier is known per se and may be replaced by any other equivalent means.

Figure 6:
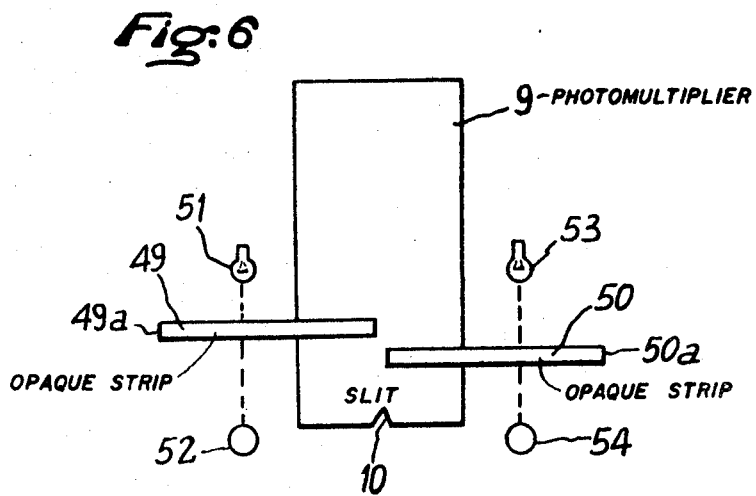
FIG. 6 is a diagrammatic view, in a plane parallel to its movement, of the device which produces the stop signals. Shown very diagrammaticaly in FIG. 1 are the two optical systems, known per se, associated with the rotor 1 of the apparatus.

FIG. 6 shows diagrammatically two opaque strips 49 and 50 which are secured to the photomultiplier 9 and located in a plane parallel to its plane of displacement.

A unit, consisting of a lamp 51 and a photodetector 52, is secured to the stand of the apparatus to the left of the photomultiplier and another unit, consisting of a lamp 53 and photodetector 54, is secured to the stand of the apparatus on the other side of the photomultiplier.

When the photomultiplier occupies the mid-position of its movement, the slit 10 is at equal distances from the two lines perpendicular to the movement and passing through the units 51–52 and 53–54 respectively. The two photodetectors then produce the signal O.

When the photomultiplier moves toward the left from this midposition, there arrives a moment when the right end 50a of the strip 50 is placed on the line 53–54. The photodetector 54 then starts to produce a signal 1. Likewise, the photodetector 52 starts to produce a signal 1 when, as the photomultiplier moves towards the right from its mid-position, the left end 49a of the strip 49 is placed on the line 51–52. Thus the stop signals mentioned hereinbefore are defined very simply. It will be understood that other means for producing these signals may be imagined.

In a general way, the apparatus described and illustrated may be modified without departing from the scope and spirit of the invention.

In particular, instead of employing, for producing the synchronization pulses, the passage of the auxiliary light beam through the geometric reference orifice 24 of the rotor (FIG. 1) there may be employed the passage of the beam through orifices of the counterweight or any other means for producing an electrical pulse each time the rotor occupies a predetermined angular position.

When the apparatus is not intended to be associated with a computer (the treatment of the pulses, after their separation and their individual integration, then being effected by analog means) means will no longer be available for calculating from a single synchronization pulse per revolution of the rotor, the instants of the triggering of the gates of the separation logical circuit. But it is then possible to produce several synchronization pulses per revolution, corresponding respectively to several predetermined angular positions of the rotor, which are so selected that the instants of production of these pulses suitably frame each of the pulses to be separated.

For this purpose, there may be, for example, associated with the slit of the measurement photomultiplier one or several pairs of two mirror so positioned and oriented that they receive the measurement light beam, one a slightly before and the other slightly after, the instant when said beam reaches said slit and that they send back said beam in the direction of an auxiliary photomultiplier. The latter will then produce, for each pair, two pulses which frame one of the pulses.

It is also possible to contemplate placing said mirrors in the parts of the optical path of the measurement light beam in the vicinity of the rotor, so that said beam intercepts one of the mirros slightly before passing through the measurement cell, whereas it intercepts the other mirror a slightly after having passed through said cell.

However, all these arrangements present difficulties as concerns their construction and operation and they are not as good as the arrangement described hereinbefore with reference to the drawings.

It should be mentioned that in its preferred embodiment, in which the apparatus is associated with a computer, 2, 3 or 4 or any number of double-sector cells may be simultaneously analyzed with no difficulty.

I claim:

1. An analytical centrifuge of the type comprising a rotor, at least one centrifuging cell having two compartments disposed in said rotor, a fixed light source emitting a light beam, an optical system forming an image of the contents of the cell at the instants when the cell intercepts said light beam, a measurement photomultiplier having a signal output and a slit and means moving the slit and measurement photomultiplier to explore said image whereby signals varying in accordance with the Optical density at the various points of the image are produced at the said signal output, gating means connected to the said signal output for selecting the two elementary signals corresponding to the passage of the light beam into each of the two compartments of each cell from the very beginning to the very end of the passage of this light beam through the slit of the measurement photomultiplier, and means, connected to said gating means for separately processing the said elementary signals, means, including an auxiliary photomultiplier cooperating with a further fixed light source which emits an auxiliary light beam and at least one reference mark of angular position on the rotor with which the auxiliary light beam cooperates for producing synchronization pulses, said means for processing the two elementary signals comprising two integrator circuits which respectively integrate separately, for each revolution of the rotor, the instantaneous amplitude of the said two elementary signals, and said gating means being actuated by the said synchronization pulses for at least one predetermined angular position of the said rotor.

2. An analytical centrifuge as claimed in claim 1, wherein said means moving the slit effects at least one outward and return exploration of the image of the cell, said means for processing the information comprising means for calculating the optical density in a plurality of positions occupied in succession by said measurement photomultiplier in the course of its outward exploration, means for calculating the optical density in the course of the return exploration for the same positions and means for taking a mean value of the two values of optical density thus obtained for each of said positions.

3. An analytical centrifuge as claimed in claim 1, wherein the said means for producing synchronization pulses include an auxiliary optical system and at least one geometric reference orifice on the rotor, said auxiliary photomultiplier receiving for each revolution of the rotor said auxiliary light beam after passage of the auxiliary light beam through said geometric reference orifice so as to produce said synchronization pulses.

4. An analytical centrifuge as claimed in claim 2, comprising a coding device related to the movement of the slit and producing for each exploration, a plurality of abscissae pulses, said abscissae pulses and the corresponding values of the optical densities being memorized for each revolution of the rotor, in the course of the outward exploration so as to effect, in the course of the return exploration, an addressing in the same memory of the values of the optical densities corresponding to the same positions.

5. An analytical centrifuge as claimed in claim 4, comprising two making means secured to said measurement photomultiplier and two units each comprising a light source and a photoelectric detector cooperating respectively with said two masking means so as to produce right and left stop signals which start and stop the measurement and reverse the direction of movement of said measurement photomultiplier.

6. An analytical centrifuge as claimed in claim 1, comprising means for effecting the analog-digital conversion of the signals from the two integrator circuits and means for processing the digital information thus obtained, said processing means calculating from intervals of time defined by synchronization pulses, fractions of said intervals of time at the end of which said gating means will be actuated for separating signals corresponding to the respective cells and to the two compartments of each cell.

7. An analytical centrifuge as claimed in claim 4, comprising two masking means secured to said measurement photomultiplier and two units each comprising a light source and a photoelectric detector cooperating respectively with said two masking means so as to produce right and left stop signals which start and stop the measurement and reverse the direction of movement of said measurement photomultiplier, means for effecting the analog-digital conversion of the signals from the two integrator circuits and means for processing the digital information thus obtained, said processing means calculating, from intervals of time defined by said synchronization pulses, fractions of said intervals of time at the end of which said gating means will be actuated for separating the signals corresponding to the respective cells and to the two compartments of each cell, said means for processing the digital information receiving said stop signals and controlling when actuated by said stop signals, the starting and the stopping of the measurement and the reversal of the direction of movement of said measurement photomultiplier.

* * * * *